UNITED STATES PATENT OFFICE 2,643,227

METHOD OF INHIBITING CORROSION OF METALS

William B. Hughes, Bartlesville, and Bennie Heinze, Pawhuska, Okla., assignors to Cities Service Oil Company, Bartlesville, Okla., a corporation of Delaware No Drawing. Application February 21, 1950, Serial No. 145,586

8 Claims. (Cl. 252—8.55)

This invention relates to inhibiting corrosion of metals and is more particularly concerned with improved compositions and processes for treating natural oil-brine mixtures to reduce the corrosive action upon production, transmission, and other oil field equipment.

It is a well-known fact that many oil producing formations yield with the crude oil a brine which is extremely corrosive in its action upon metal tubing, casings, pumps and other oil producing and collection equipment; and that this type of corrosion is particularly noticeable in wells producing brines containing dissolved hydrogen sulfide, carbon dioxide, or other acidic materials. In the past, efforts have been made to reduce the cost of maintaining production and collection equipment by introducing into the well caustic soda or other alkaline solutions in such proportion as to neutralize the acidic components, or by the use of certain water-soluble corrosion inhibiting agents such as formaldehyde, bone oil, nitrogen bases of various types, amines, and combinations of these reagents. While these corrosion inhibitors are very satisfactory when used in wells which produce little water as compared to the oil produced, their cost becomes prohibitive when used in wells producing large amounts of water, since the same concentration of the inhibitor must be maintained in the water phase in both types of wells in order to satisfactorily prevent corrosion of the equipment.

It is an object of this invention to provide oil-soluble compositions which may be economically employed in preventing corrosion in wells producing oil-brine mixtures, and especially in those producing large amounts of brine as compared to oil.

We have discovered that the products obtained by reacting a polyethylene amine and an aldehyde and neutralizing in whole or in part with a carboxylic acid, are very effective in inhibiting the corrosive action of oil well brines. The compositions which we have found to be particularly effective are the products obtained by reacting one mol of a polyethylene amine with one mol of aldehyde, and then neutralizing the product with a carboxylic acid in such amount that one mol of acid is present for each nitrogen atom of the polyethylene amine utilized, although various other proportions of acid to amine may be used. Among the amines which are suitable for our products may be included diethylene triamine, triethylene tetramine, and tetraethylene pentamine. The aldehydes may include formaldehyde, acetaldehyde, butyraldehyde, heptaldehyde, nonylaldehyde, benzaldehyde, and furfural. Acids suitable for use in the formulation of our corrosion inhibitors include butyric, caprylic, stearic, oleic, tall oil, linseed oil acids, naphthenic, ricinoleic, hydroxy acids derived from the partial oxidation of hydrocarbon wax, abietic acid, Twitchell reagents, and sulfonated oleic acid. It will be seen from the foregoing that we are not limited in any way to our choice of aldehyde or acid since apparently aldehydes of any molecular weight or structure, including aliphatic, aromatic, and heterocyclic have shown excellent results. Likewise, the carboxylic acids used in the formulation of our compounds may be of practically any molecular weight, and may be aliphatic, either substituted or unsubstituted, hydroxy acids, or acids containing various ring structures.

As an example of the method by which our compositions may be prepared, the following example is given, it being understood, however, that the exact conditions given in the example are not in any way critical and that other reagents such as described above may be reacted under more or less similar conditions.

*Example*

Thirty-one and one-half pounds of triethylene tetramine were placed in a reactor and agitation begun. Six and one-half pounds of formaldehyde in aqueous solution were then added slowly to the triethylene tetramine. The resultant reaction was quite vigorous and the rate of aldehyde addition was controlled so as to minimize the severity of boiling and frothing. As soon as the aldehyde was completely added, heat was applied and 232 pounds of oleic acid was mixed in. Heating was continued with agitation until the mass was boiling, at about 100° C., and thereafter until the boiling point had reached about 110° C. at which time heating was discontinued.

The reaction product may be used as is, but since it is a heavy black oil which becomes a semisolid at temperatures below 20–25° C., it may be diluted with kerosene or other suitable solvent to the desired viscosity for introduction into the producing well which it is desired to protect against corrosion.

The effectiveness of our compositions in inhibiting the corrosiveness of oil field brines may be better and more fully understood by reference to certain tests which we have conducted using natural brines taken from producing wells together with oil from the same well. The test procedure involved a measurement of the corrosive action of these well fluids as inhibited with the compositions described above upon thoroughly cleaned and polished strips of No. 18 gauge hot rolled steel strips ½ inch by 3¾ inches in size, under conditions closely approximating those existing in a producing oil well, and a comparison thereof with the results obtained by subjecting identical test strips to the corrosive action of well fluids alone.

Cleaned and numbered one-quart bottles were purged with natural gas. Oil saturated with hydrogen sulfide by bubbling the gas through the liquid for about three hours was added to the half-full mark on the bottle. Brine containing carbon dioxide, and also saturated with hydrogen sulfide was added to almost completely fill the bottle. A quantity of our new compounds was then added to each bottle in amounts ranging from 50 to 200 parts per million, based on the oil content of the bottle. The weighed steel strips were then affixed to the end of a glass rod in such a manner that two pieces of Tygon tubing prohibited contact between the strip and the glass while a third piece of tubing held the strip firmly in position. The length of the glass rod was such that the midpoint of the test strip was approximately at the interfacial level when the rod itself was held in the bottle by a tightly fitting one-holed rubber stopper.

At all times precautions were maintained to exclude air from the bottles by frequent and liberal purging with oxygen-free natural gas. The bottles containing the oil, the brine, and the strips were then mounted upon the periphery of a horizontal drum, which was slowly revolved so as to alternately bring the surface of the steel strip in contact with the oil and with the brine. At the end of two weeks the bottles were taken off the drum and the strips removed. The strips were first washed in kerosene and then methanol, and finally water, prior to cleaning. Cleaning consisted of carefully treating in one weight per cent hydrochloric acid solution for a few seconds at a time, washing with water, and thoroughly wiping with cheese cloth between each acid treatment. When the original lustre had been restored as nearly as possible with a minimum amount of acid treating, the strips were again washed in methanol followed by acetone. The dry strips were then reweighed to determine the weight loss; blanks were run to provide a basis for comparison.

The changes in the weight of the test strips during the corrosion test were taken as a measurement of the effectiveness of the inhibitor compositions. Thus we calculated a protection percentage for each of the test strips taken from the inhibited well fluids in accordance with the following formula:

$$\frac{L1-L2}{L1} \times 100$$

in which $L1$ is the loss in weight of strips taken from uninhibited well fluids, and $L2$ is the loss in weight of strips which were subjected to the inhibited well fluids. The results of these test calculations are summarized in the table in which TETA is triethylenetetramine, TEPA is tetraethylenepentamine, DETA is diethylenetriamine; blanks indicate that no tests were run at those concentrations. The first three columns of the table indicate the particular amines, aldehydes, and acids used in formulating the inhibitor tested, the fourth column indicates the molar proportions in which they were reacted, and the fifth and sixth columns indicate the protection afforded by each compound when used in the amount of 200 parts per million and 50 parts per million in the oil, calculated by the foregoing formula:

TABLE

| Inhibitor | | | Mol Ratio | Protection, percent | |
|---|---|---|---|---|---|
| Amine | Aldehyde | Acid | | 200 p. p. m. | 50 p. p. m. |
| TETA | Formaldehyde | Oleic | 2-2-1 | 87 | 67 |
| TETA | do | do | 1-1-1 | 94 | 40 |
| TETA | do | do | 2-2-5 | 92 | 77 |
| TETA | do | do | 1-1-3 | 91 | 70 |
| TETA | do | do | 1-1-4 | 97 | 91 |
| TETA | do | do | 1-1-5 | 76 | 85 |
| TETA | do | do | 1-1-6 | 77 | 89 |
| TETA | do | Butyric | 1-1-4 | 81 | |
| TETA | do | Caprylic | 1-1-4 | 93 | 90 |
| TETA | do | Stearic | 1-1-4 | 91 | 70 |
| TETA | do | Tall oil | 1-1-4 | 86 | 92 |
| TETA | do | Lindseed Acids | 1-1-4 | 90 | 47 |
| TETA | do | Naphthenic | 1-1-4 | 91 | 88 |
| TETA | do | Ricinoleic | 1-1-4 | 86 | 92 |
| TETA | do | Wax Hydroxy | 1-1-4 | 87 | 91 |
| TETA | do | Abietic | 1-1-4 | 81 | 80 |
| TETA | do | Twitchell Reagent (benzene) | 1-1-4 | | 94 |
| TETA | do | Twitchell Reagent (naphthalene) | 1-1-4 | | 94 |
| TETA | do | Sulfonated oleic | 1-1-4 | | 94 |
| TETA | Acetaldehyde | Oleic | 1-1-4 | | 82 |
| TETA | Butyraldehyde | do | 1-1-4 | | 86 |
| TETA | Heptaldehyde | do | 1-1-4 | | 92 |
| TETA | Nonylaldehyde | do | 1-1-4 | | 94 |
| TETA | Benzaldehyde | do | 1-1-4 | | 94 |
| TETA | Furfural | do | 1-1-4 | | 90 |
| TEPA | Formaldehyde | do | 1-1-5 | | 91 |
| DETA | do | do | 1-1-3 | | 78 |

It will thus be evident that corrosion may be reduced to a value of one tenth or less of the corrosion due to the natural flow of well fluids through the well tubing and gathering lines, by the incorporation of very minor quantities of our new compounds into the well fluid.

In using our improved compositions for protecting oil well tubing, casing, and other equipment which comes in contact with the corrosive oil-brine production, we find that excellent results may be obtained by injecting an appropriate quantity of a selected composition into a producing well so that it may mingle with the oil-brine mixture and come into contact with the casing, tubing, pumps, and other producing equipment. We may, for example, introduce the inhibiting composition into the top of the casing, thus causing it to flow down into the well and thence back through the tubing, etc. In general, we have found that this procedure suffices to inhibit corrosion throughout the entire system of production, and collection, even including field tankage.

The nature of the inhibiting action of our improved compositions is not fully understood, but apparently the compositions act to preferentially wet the surface of the metal equipment with oil, thus excluding brine from contact with the metal. In any event, however, no matter what the mechanics of the corrosion inhibiting may be, they are extremely and surprisingly effective in protecting metal parts from corrosion even when used in amounts of fifty parts per million or less based on the oil content of the well fluids.

It is to be understood that the improved compositions of our invention are not limited to use alone and may be employed along with other agents commonly introduced into producing oil wells for breaking emulsions, limiting scale formation, etc. It is further evident that our invention is not restricted to the use of improved compositions for inhibiting corrosion in oil wells but may be employed to perform this function in the presence of corrosive brines of other origin.

Having now described our invention, what we claim as new and useful is:

1. The process of preventing the corrosion of metals when exposed to contact with corrosive oil well fluids which comprises incorporating into the well fluids a small but sufficient proportion of the reaction product of a spontaneous reaction between approximately equimolar quantities of a polyethylene amine and an aldehyde, neutralized by a carboxylic acid.

2. The process of preventing the corrosion of metals when exposed to contact with corrosive oil well fluids which comprises incorporating into the well fluids a small but sufficient proportion of the reaction product of the spontaneous reaction of approximately equimolar quantities of a polyethylene amine, and an aldehyde, neutralized with a carboxylic acid, the quantity of acid used being from about 0.5 to about 1.5 mols of acid per nitrogen in the amine.

3. The process of preventing the corrosion of metals when exposed to contact with corrosive oil well fluids which comprises incorporating into the well fluids a small but sufficient proportion of the reaction product of the spontaneous reaction of approximately equimolar quantities of a polyethylene amine and an aldehyde, neutralized with a carboxylic acid in an amount equivalent to one mol of acid for each nitrogen atom in the amine.

4. The process of preventing the corrosion of metals when exposed to contact with corrosive oil well fluids which comprises incorporating into the well fluids a small but sufficient proportion of the reaction product of the spontaneous reaction of about one mol of triethylenetetramine and one mol of an aldehyde neutralized with four mols of a carboxylic acid.

5. The process of preventing the corrosion of metals when exposed to contact with corrosive oil well fluids which comprises incorporating into the well fluids a small but sufficient proportion of the reaction product of the spontaneous reaction of about one mol of triethylenetetramine and one mol of formaldehyde, neutralized with four mols of a carboxylic acid.

6. The process of preventing the corrosion of metals when exposed to contact with corrosive oil well fluids which comprises incorporating into the well fluids a small but sufficient proportion of the reaction product of the spontaneous reaction of about one mol of triethylenetetramine and one mol of formaldehyde, neutralized with four mols of oleic acid.

7. The process of preventing the corrosion of metals when exposed to contact with corrosive oil well fluids which comprises incorporating into the well fluids a small but sufficient proportion of the reaction product of the spontaneous reaction of one mol of tetraethylenepentamine and one mol of formaldehyde, neutralized with five mols of oleic acid.

8. The process of preventing corrosion of metals when exposed to contact with corrosive oil well fluids which comprises incorporating into the well fluids a small but sufficient proportion of the reaction product of the spontaneous reaction of about one mol of triethylenetetramine and one mol of benzaldehyde, neutralized with four mols of oleic acid.

WILLIAM B. HUGHES.
BENNIE HEINZE.

References Cited in the file of this patent

UNITED STATES PATENTS

| Number | Name | Date |
| --- | --- | --- |
| 1,771,985 | Calcott et al. | Aug. 5, 1930 |
| 2,276,309 | Hummel et al. | Mar. 17, 1942 |
| 2,290,412 | De Groote et al. | July 21, 1942 |
| 2,291,396 | Lieber | July 28, 1942 |
| 2,297,864 | Beck | Oct. 6, 1942 |
| 2,426,318 | Menaul | Aug. 26, 1947 |
| 2,466,517 | Blair et al. | Apr. 5, 1949 |
| 2,468,163 | Blair et al. | Apr. 26, 1949 |
| 2,496,596 | Moyer et al. | Feb. 7, 1950 |